US007689389B1

(12) United States Patent
Mukherjee et al.

(10) Patent No.: US 7,689,389 B1
(45) Date of Patent: Mar. 30, 2010

(54) SYSTEM AND METHOD FOR SYNCHRONIZING AND USING A THREE DIMENSIONAL VIEW WITH A BLOCK DIAGRAM MODEL

(75) Inventors: Arnav Mukherjee, Newton, MA (US); Jeff Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 3 days.

(21) Appl. No.: 11/891,550

(22) Filed: Aug. 10, 2007

Related U.S. Application Data

(63) Continuation of application No. 10/887,708, filed on Jul. 9, 2004, now Pat. No. 7,519,516.

(51) Int. Cl.
*G06F 7/60* (2006.01)
*G06F 17/50* (2006.01)

(52) U.S. Cl. .............................................. 703/2; 703/1
(58) Field of Classification Search ...................... 703/2, 703/1
See application file for complete search history.

(56) References Cited

U.S. PATENT DOCUMENTS 6,049,621 A * 4/2000 Jain et al. .................... 382/125

OTHER PUBLICATIONS

Dymola Daynamic Modeling Laboratory, User's Manual, Dynasim AB, 1992-2002. pp. 1-212.*

SolidWorks Corporation, Comparing solidWorks 2001 With Solid Edge V9., 2001. p. 1-13.*

* cited by examiner

*Primary Examiner*—Paul L Rodriguez
*Assistant Examiner*—Eunhee Kim
(74) *Attorney, Agent, or Firm*—Lahive & Cockfield, LLP; Kevin J. Canning

(57) ABSTRACT

A method of synchronizing a block diagram view of a system being modeled with a three-dimensional view of the system being modeled and with the underlying block diagram model data is disclosed. Changes in the block diagram model data are reflected in both views to the degree that the views contain a point of correspondence. User selected changes to the block diagram view of the system being modeled cause changes in the underlying model data. A view generator examines the model data to determine if a point of correspondence equivalent to the changed portion of the block diagram view exists in the three dimensional view. If a point of correspondence exists in the three-dimensional view the view is updated to reflect the changes in the block diagram view. Similarly, user selected changes in the three-dimensional view cause changes in the underlying block diagram model data. The view generator examines the model data to determine if a point of correspondence equivalent to the changed portion of the three dimensional view exists in the block diagram view. In the event that a point of correspondence is found, the block diagram view is updated.

22 Claims, 6 Drawing Sheets

SYSTEM AND METHOD FOR SYNCHRONIZING AND USING A THREE DIMENSIONAL VIEW WITH A BLOCK DIAGRAM MODEL

CROSS-REFERENCE TO RELATED APPLICATION

This application is a continuation under 35 U.S.C. §120 of U.S. patent application Ser. No. 10/887,708, filed Jul. 9, 2004 titled, "System and Method for Synchronizing and Using a Three Dimensional View with a Block Diagram Model," the entire disclosure of which is hereby incorporated by reference for all purposes.

FIELD OF THE INVENTION

The illustrative embodiment of the present invention relates generally to the modeling of a system in a block diagram environment, and more particularly to the generation and use of a three-dimensional view of a block diagram model linked to a block diagram view of the block diagram model.

BACKGROUND

Block diagrams enable complex systems to be modeled in a block diagram environment. In a block diagram environment, such as Simulink® from The MathWorks of Natick, Mass., a block diagram model holds data representing system component attributes and functionality. The block diagram model is frequently represented in a block diagram view of the model. The block diagram view includes multiple blocks representing the system components as well as lines between blocks representing logical or physical connections between system components. The block diagram model may also be used to simulate the execution of the system being modeled. The results of the simulation may be presented with a basic two dimensional animation of the system being modeled. A more realistic three-dimensional animation of the system being modeled may also be presented to a user.

FIG. 1A (prior art) represents a block diagram 2 of a system being modeled, a four cylinder engine. The block diagram contains information about system components and connections between components that may be used by a simulator to run a simulation of the execution of the system. An animated depiction of the system being modeled may be displayed to a viewer during the simulation. An example of the animation of a system simulation may be seen in FIG. 1B (prior art), which represents a three-dimensional view 4 of the four cylinder engine represented in the block diagram 2. The three dimensional view 4 is produced by The Virtual Reality Toolbox™ for MATLAB®. The Virtual Reality Toolbox™ may also be used with SimMechanics™. SimMechanics™ is a mechanical body modeling application used in conjunction with Simulink®.

A three-dimensional view of a system being modeled enables a user to connect bodies together, position the bodies, and orient the bodies in relationship to each other during construction and editing of a model when connected to a block diagram design environment. The three-dimensional view alleviates the need for extensive knowledge of the coordinate systems frequently required for the block diagram view of the system. It should be noted that although the term "three-dimensional" is used herein, the term "three-dimensional" refers to the impression of three-dimensions given to a user observing the view of the system being modeled. Those skilled in the art will understand that the three dimensional view of the system is frequently rendered on a two-dimensional display surface and is rendered so as to give the impression of a third-dimension (i.e., depth) on the two-dimensional surface. In the block diagram view, such as that shown in FIG. 1A, it is frequently easier to create large hierarchical designs and/or use complicated force laws using Simulink® or SimMechanics than it is to create such designs or model such forces in a three-dimensional environment. However, conversely it is frequently more difficult to visualize the interrelationship of the various components of a system being modeled. Unfortunately, conventional block diagram environments do not allow a user to easily transition from a three-dimensional view of a system being modeled to a block diagram view of the system so as to utilize the positive aspects of both design environments.

BRIEF SUMMARY OF THE INVENTION

The illustrative embodiment of the present invention synchronizes a block diagram view of a system being modeled with a three-dimensional view of the system being modeled and with the underlying block diagram model data. Changes in the block diagram model data are reflected in both views to the degree that the views contain a point of correspondence to the altered data. User selected changes to the block diagram view of the system being modeled cause changes in the underlying model data. A view generator examines the model data to determine if a point of correspondence equivalent to the changed portion of the block diagram view exists in the three dimensional view. If a point of correspondence exists in the three-dimensional view the view is updated to reflect the changes in the block diagram view. In one implementation, the three-dimensional view may be updated concurrently with the updates to the block diagram view. Similarly, user selected changes in the three-dimensional view cause changes in the underlying block diagram model data. The view generator examines the model data to determine if a point of correspondence equivalent to the changed portion of the three dimensional view exists in the block diagram view. In the event that a point of correspondence is found, the block diagram view is updated.

In one embodiment a method uses an electronic device that includes a block diagram environment with at least one block diagram model. The block diagram model includes multiple components. The electronic device is interfaced with a display surface displaying a block diagram view of the block diagram model. The block diagram view provides a user interface allowing alteration of the block diagram view by a user, the alteration causing a corresponding alteration in said block diagram model. The method alters a component in the block diagram view and updates programmatically the block diagram model in response to the altering of the component in the block diagram view. The method then displays an updated three dimensional view of the block diagram model that reflects the altering of the component in the block diagram view.

In another embodiment a method uses an electronic device that includes a block diagram environment with at least one block diagram model. The block diagram model includes multiple components. The electronic device is interfaced with a display surface displaying a block diagram view of the block diagram model. The block diagram view provides a user interface allowing alteration of the block diagram view by a user, the alteration causing a corresponding alteration in said block diagram model. The method alters a component in the three dimensional view and programmatically updates the block diagram model in response to the altering of the component in the three dimensional view. The method then displays an updated block diagram view of the block diagram model that reflects the altering of the component in the three dimensional view.

In an embodiment a system in an electronic device includes a block diagram environment having at least one block diagram model. The block diagram model has multiple components. The block diagram environment also includes a modeling library holding multiple model components that are available to construct a block diagram model. The block diagram environment further includes a view generator that is able to generate views of the block diagram model for display to a user. The system also includes a display surface for displaying multiple views of the block diagram. The views displayed include a block diagram view of the block diagram model produced by the view generator. The block diagram view provides a user interface that allows alteration of the model being viewed by the user. The views displayed on the display surface further include a three-dimensional view of a block diagram model. The three-dimensional view is based on the block diagram model and is produced by the view generator. The three-dimensional view provides a user interface allowing alteration of the model being viewed by the user. The alteration causes a corresponding alteration in the block diagram model.

In another embodiment in an electronic device holding a block diagram environment where the block diagram environment includes at least one block diagram model, the electronic device is interfaced with a display surface that displays a block diagram view of a system being modeled in a block diagram model. A method includes the step of providing a three-dimensional view of the system being modeled in the block diagram. The three-dimensional view provides a user interface allowing alteration of the view by the user. Any alteration of the three-dimensional view by the user causes corresponding alteration in the block diagram model data. The method also includes the step of altering a component in the block diagram model data and thereafter programmatically updating the block diagram view of the block diagram and three-dimensional view of the system being modeled by the block diagram in response to the alteration.

DETAILED DESCRIPTION

The illustrative embodiment of the present invention provides a method of synchronizing a three-dimensional view of a system being modeled in a block diagram environment with a block diagram view of the system being modeled. The three-dimensional view and the block diagram view are analyzed for corresponding points by a view generator in the block diagram environment. The features that are represented in both the block diagram view and the three-dimensional view are noted. Subsequent changes to a corresponding feature or component in one of the views are thereafter reflected in the other view. In one implementation, a user's changes to one of the views causes a dynamic updating of the other view while the change is still ongoing in the first view. In another implementation the second view is updated only after the completion of the changes in the first view. The synchronization of views enables a model builder to leverage the strengths of both types of views while constructing the block diagram model.

Figure 1A:
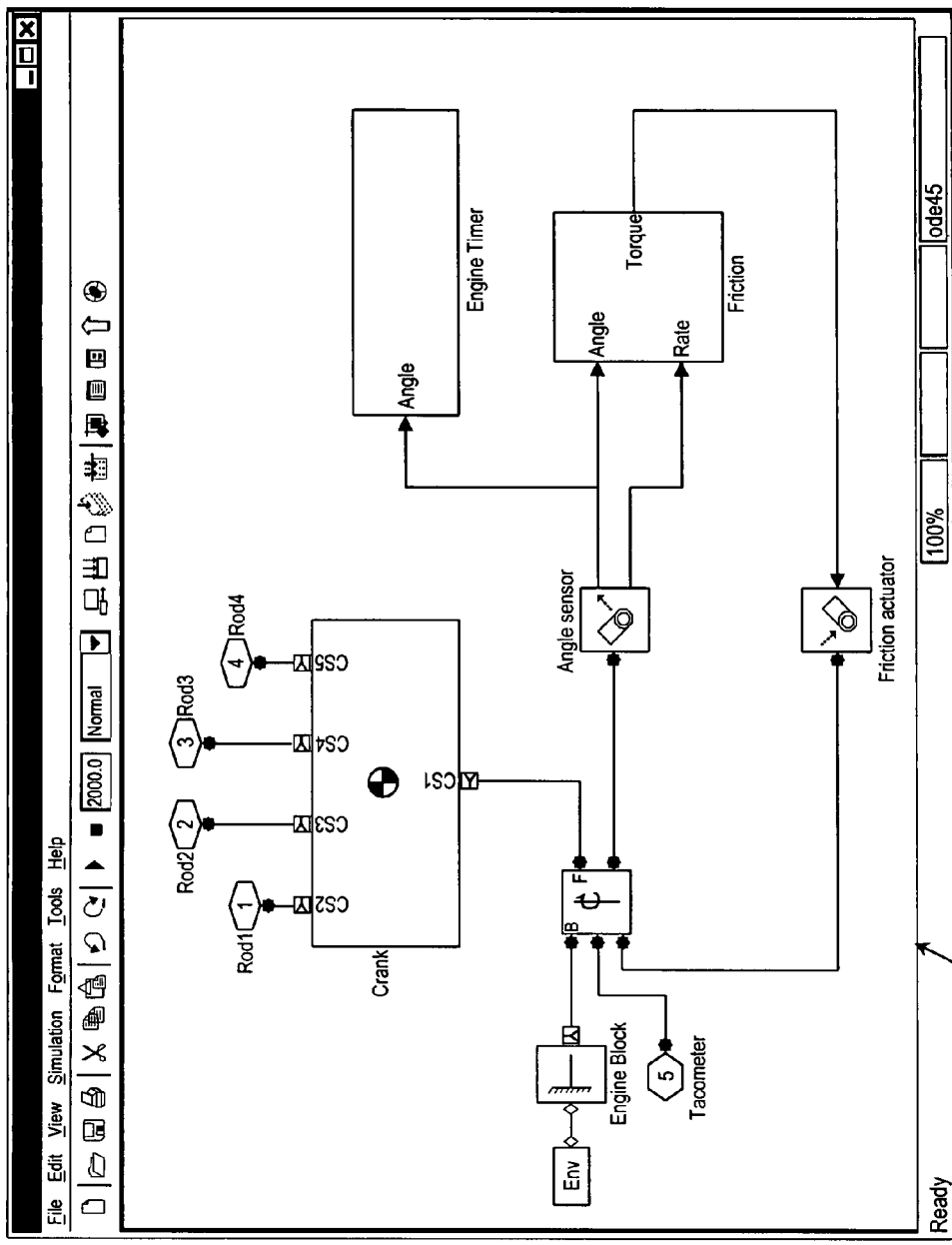
FIG. 1A (prior art) depicts a block diagram view of a 4 cylinder engine system.
Figure 1B:
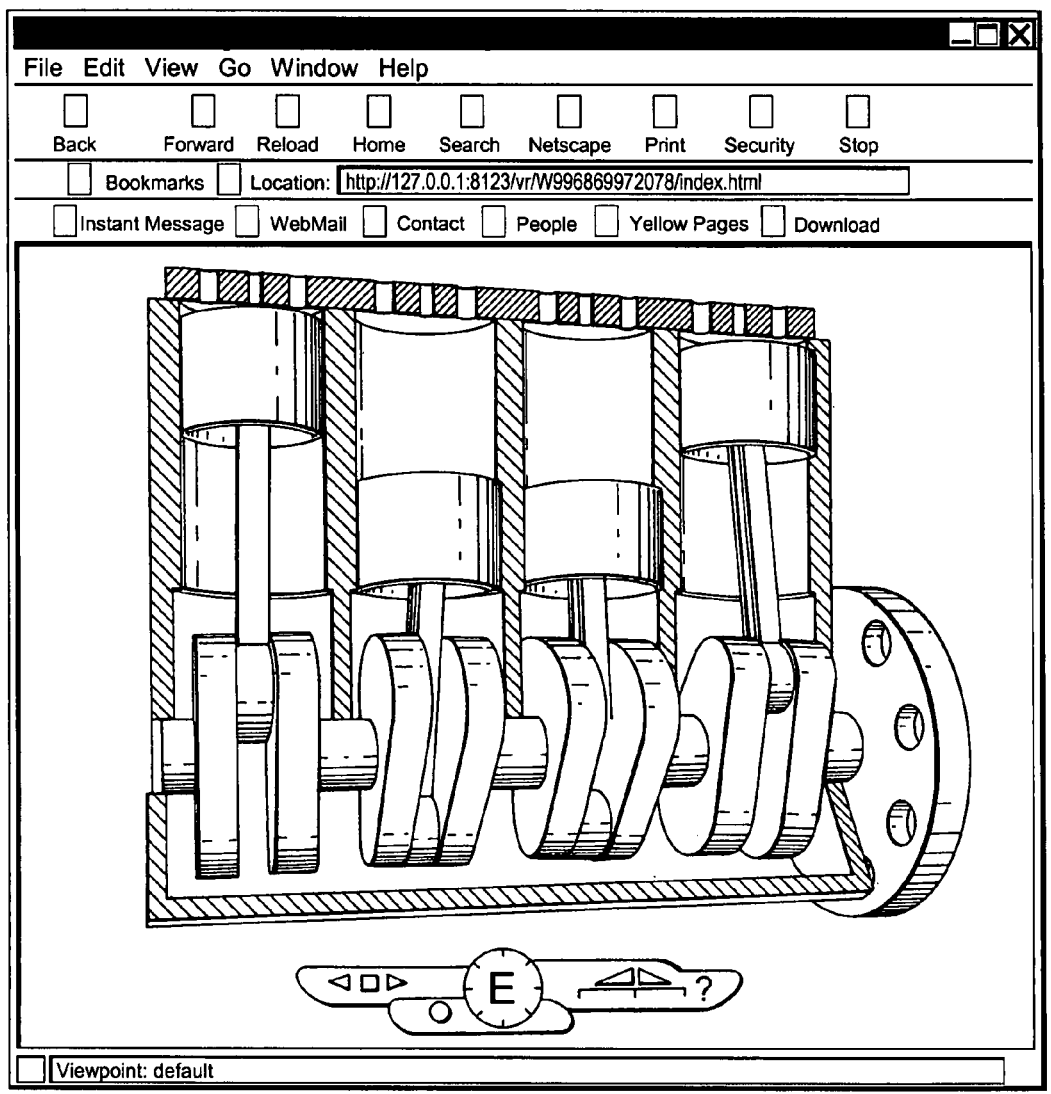
FIG. 1B (prior art) depicts a virtual reality toolbox representation of the 4 cylinder engine model of FIG. 1A.

The dimension of depth shown in FIG. 1B (prior art) enables a user to more readily appreciate the interaction of the various components of the 4-cylinder engine. The illustrative embodiment of the present invention integrates the depth perception of the three dimensional view previously used to display simulation results with the traditional block diagram design environment such that changes in the three-dimensional view are reflected in the two dimensional block diagram and vice-versa.

Figure 2:
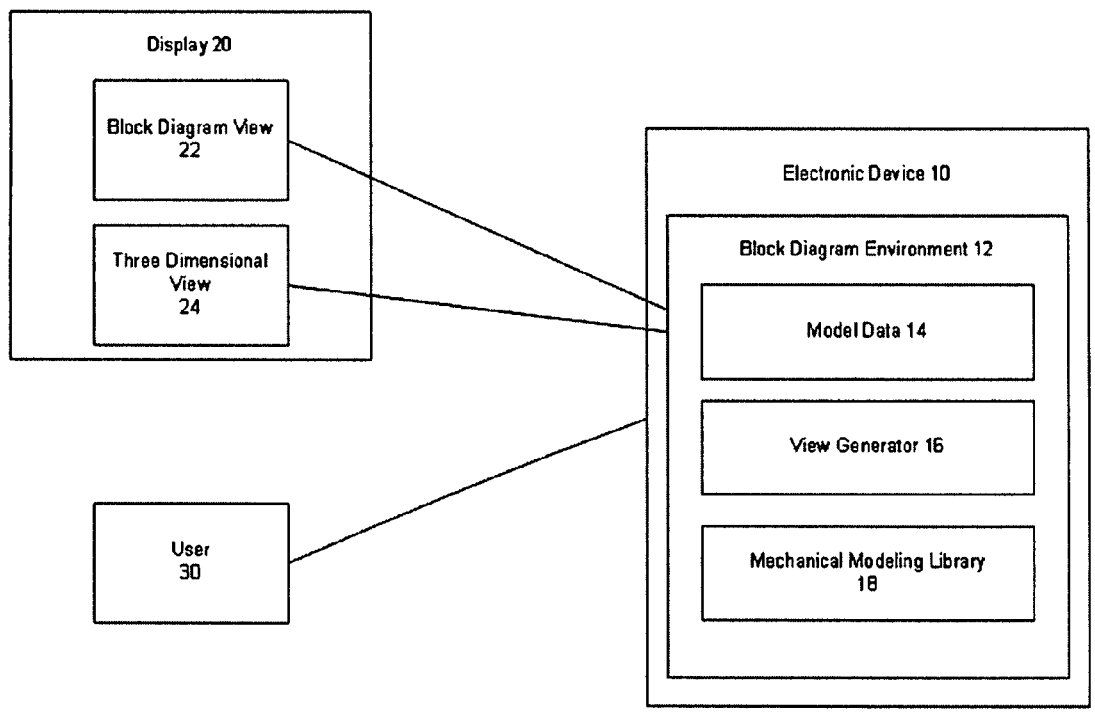
FIG. 2 depicts an environment suitable for practicing the illustrative embodiment of the present invention.

FIG. 2 depicts an environment suitable for practicing the illustrative embodiment of the present invention. An electronic device 10 supports a block diagram environment 12. The electronic device 10 may be a server, workstation, laptop, personal computer, PDA (Personal Digital Assistant), or some other type of electronic device equipped with a processor and capable of supporting the block diagram environment 12. The block diagram environment 12 such as Simulink®, includes at least one collection of block diagram model data 14, a view generator 16 and may include or be interfaced with a mechanical modeling library 18. The model data 14 is a collection of data regarding a system being modeled by the block diagram environment.

A mechanical modeling library 18, such as SimMechanics® works in conjunction with the block diagram environment 12. The mechanical modeling library 18 includes blocks enabling the simulation of forward dynamics, inverse dynamics, kinematics, linearization, and trimming to determine the steady state equilibrium points for linearization and analysis. A mechanical modeling library enables the modeling of user defined bodies specified by mass properties and coordinate systems which are connected to one another by joints that express degrees of freedom of the system. Kinematic constraints on the allowed motions of the systems bodies may be imposed. The constraints use Simulink® signals to restrict relations between the body motions and drive body motions as functions of time. The block diagram environment blocks and the mechanical modeling library block may be interfaced via actuator and sensor blocks. Actuator blocks specify the forces and motions of bodies or joints using Simulink® signals and enable the specification of a body or joint motion as position, velocity, or acceleration functions of time. The actuator blocks also enable the detection of discrete events arising from discontinuous friction forces and enable the preparation of a systems initial state from a dynamic simulation. The sensor blocks may be used to detect the motion of bodies and joints as Simulink® signals. The sensor blocks may be used to display system position, velocity, and acceleration in a Simulink® scope block. The sensor block may also be used to monitor forces in a system during a simulation.

The block diagram environment 12 is interfaced with a display surface or device 20 that includes a block diagram view 22 of the system being modeled and a three-dimensional view 24 of the system being modeled. The block diagram view 22 models the system by depicting the model data 14 as a series of blocks and lines representing model components and connections. For example, FIG. 1A (prior art) represents a block diagram view 22 of a four cylinder engine. The three-dimensional view 24 models the components represented in the model data 14 of the system being modeled as an integrated whole. For example, FIG. 1B (prior art) represents a type of three-dimensional view of a block diagram model. The illustrative embodiment of the present invention, however, in addition to providing a block diagram view and a three-dimensional view of the system being modeled, also synchronizes the block diagram view 22 and the three-dimensional view 24 such that changes in a view or the underlying model data may be reflected programmatically in a corresponding view(s). A user 30 may make changes either in the block diagram model data 14 directly or via the user interface available through the block diagram view 22 or three-dimensional view 24.

Figure 3:
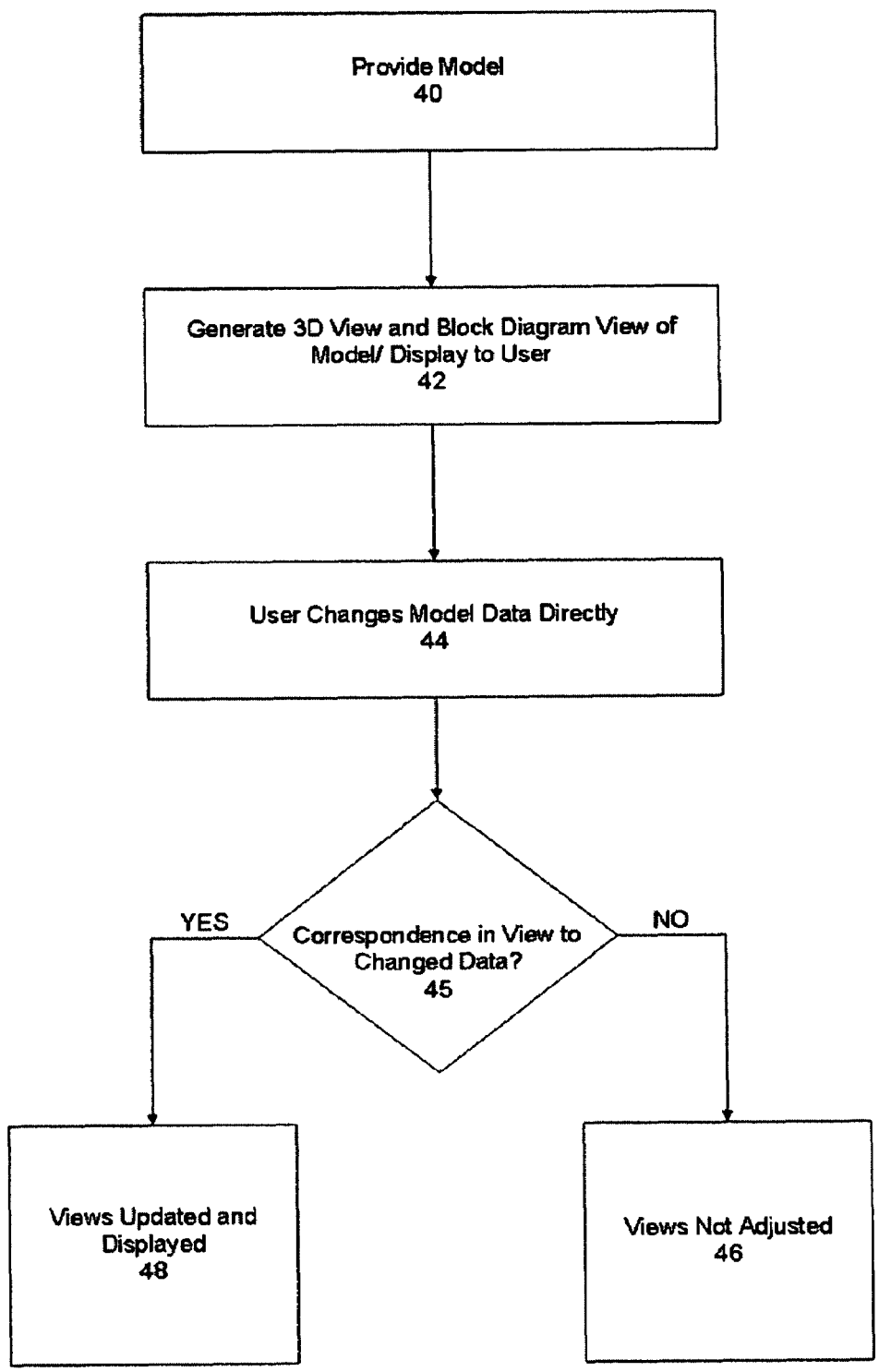
FIG. 3 is a flow chart of the sequence of steps followed by the illustrative embodiment of the present invention to synchronize changes in the underlying model data with the block diagram and three-dimensional views of the block diagram model.

The sequence of steps by which the illustrative embodiment of the present invention programmatically changes both the block diagram view 22 and the three-dimensional view 24 in response to changes in the underlying model data 14 is depicted in FIG. 3. The sequence begins with the creation or retrieval of a block diagram model data 14 in the block diagram environment 12 (step 40). The view generator 16 uses the model data 14 to generate a block diagram view 22 and three-dimensional view 24 of the system being modeled which are displayed to the user (step 42). Subsequently, a user-selected change in the model data 14 (step 44) is performed. The block diagram view 22 and three-dimensional view 24 are examined by the view generator 16 to determine if each of the views contains a point of correspondence to the altered model data (step 45). In the event that no point of correspondence in the block diagram view 22 or three-dimensional view 24 is detected by the view generator 16, the view is left alone and not updated (step 46). However, in the event a point of correspondence in either the block diagram view 22 or three-dimensional view 24 is detected, a change is made to the view containing the point of correspondence and the updated view is displayed to the user (step 48).

Not every piece of model data 14 will have a corresponding component in the block diagram view 22 and/or three-dimensional view 24. Some data necessary to model and simulate the system does not translate well into a visual component. Additionally, some pieces of data may be visualized in one view and not the other. Certain components and features which are necessary and desirable to display in the three-dimensional view 24 do not need to be displayed in the block diagram view 22. Similarly, hierarchical connections which are desirable in the block diagram view 22 may not be desirable or able to be shown in the three-dimensional view 24. The model data 14 includes attributes indicating whether the component should be displayed in the block diagram view and/or the three dimensional view. The view generator 16 checks the attributes in the model data to determine whether the altered data belongs in an updated view. The determination as to which type of components/features of components in the model data should be rendered in the views is an implementation choice and is dependent upon a number of factors including but not limited to the ease of rendering the data in a comprehensible manner and the user's desire as to the amount of detail that should be displayed. The illustrative embodiment of the present invention enables both views to be quickly utilized by the user during the construction of a model without forcing all of the features to be shown in a single diagram. Depending upon the user's need for a particular feature, the user may consult the appropriate diagram.

Those skilled in the art will recognize that a lack of correspondence between the model data 14 and a view may be handled in a number of different ways without departing from the scope of the present invention. As noted above, the lack of correspondence may be handled by updating the model data 14 and not updating the view. Alternatively, the user may be queried to determine if a corresponding component should be added to the view. In the event of an indication from the user 30 that the non-corresponding component should be added to the view, the view generator 16 may use information regarding the component found in either the block diagram environment 12 or the mechanical modeling library 18 to add the component to the view. In a different implementation, the non-corresponding component may be added to the view automatically without user input.

Figure 4:
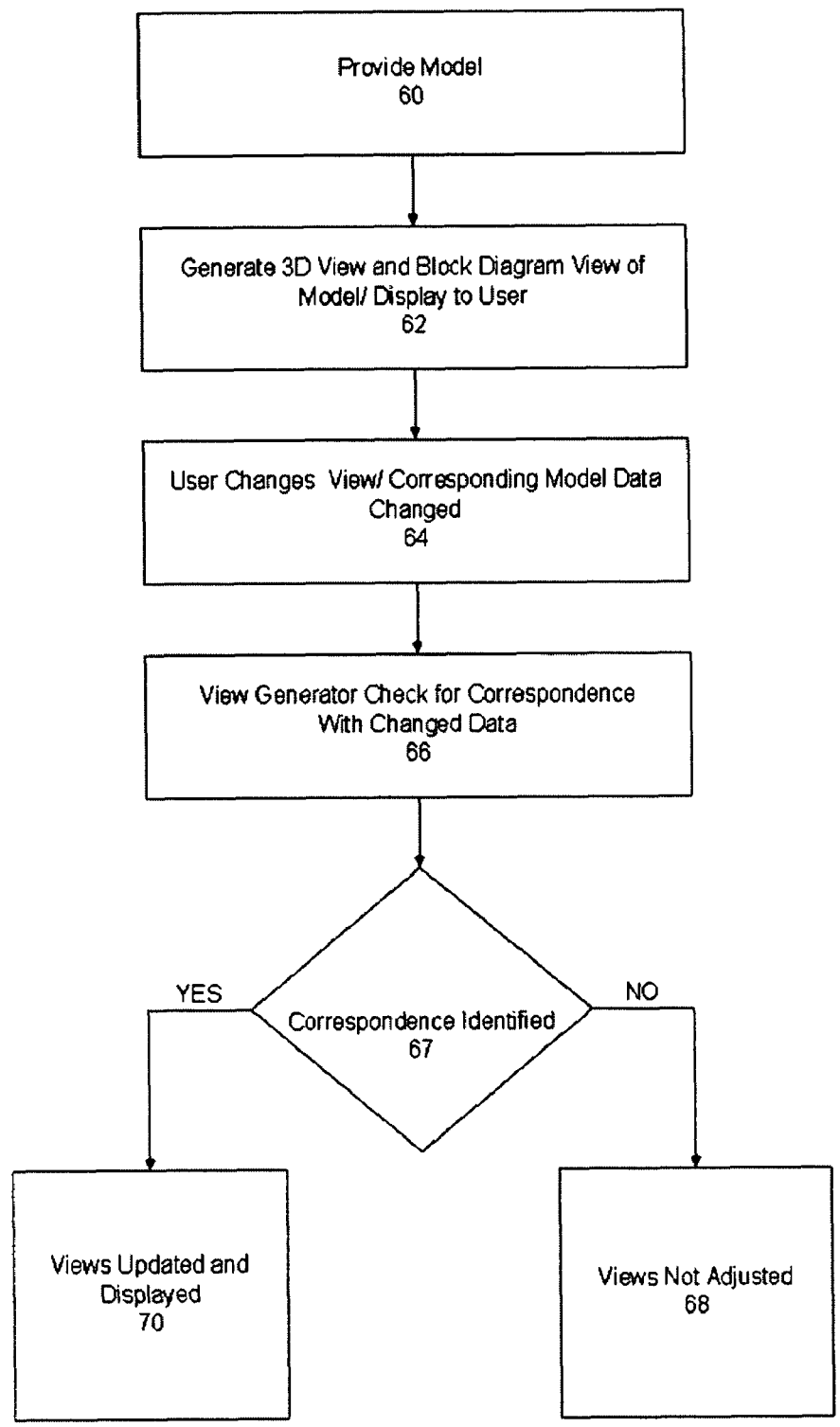
FIG. 4 depicts the sequence of steps followed by the illustrative embodiment of the present invention to synchronize changes in the block diagram view with the three-dimensional view of the block diagram model.

The illustrative embodiment of the present invention synchronizes the three dimensional view 24 with the block diagram view 22 so as to programmatically reflect changes in one view caused by an alteration in the other view. FIG. 4 illustrates the process followed by the illustrative embodiment of the present invention to synchronize a user's changes in the block diagram view 22 with the three dimensional view 24 or vice-versa. The sequence of steps begins with the creation or retrieval of a block diagram model (step 60). The corresponding block diagram view 22 and three-dimensional view 24 are then generated and displayed to the user 30 by the view generator 16 (step 62). Subsequently, a user changes one of the views through a user interface associated with the view and the corresponding model data supporting that view is also changed (step 64). The block diagram view or three-dimensional view may be changed in a number of different ways via the user interface provided with the view. Those skilled in the art will realize that there are a number of mechanisms available to enable the user (30) to manipulate the components displayed in the block diagram view 22 or three-dimensional view 24. For example, the user may use a mouse to drag a component from one position to another on the display surface. Alternatively, the user may use a command line interface provided by the view to add an additional component or reconfigure connections among the displayed components. Additionally, the displayed components may enable the user to adjust their properties such that the displayed version of the component is altered. All of the changes entered by the user are reflected in the underlying model data 14. Following the alteration of the model data 14, the view generator 16 checks the attributes associated with the changed data to determine if the non-altered view should include a displayed component corresponding to the altered data (step 66). A determination is made as to whether or not a point of correspondence exists (step 67). In the event a point of correspondence does not exist the non-altered view may be left unchanged (step 68). Alternatively, if it is determined that a point of correspondence exists in the non-altered view for the model data that was altered, the view is updated by the view generator and displayed to the user (step 70). Accordingly, the user may cause changes in the three-dimensional view by altering the block diagram view. Alternatively, manipulation of the three-dimensional display of a system being modeled may result in the generation of an altered block diagram of the model. Additionally, those skilled in the art will recognize that determinations of non-correspondence may be handled in a manner similar to that discussed above following direct user changes to the model data (i.e.: the user may be queried regarding adding the component, the component may added automatically, etc.).

The illustrative embodiment of the present invention includes two methods of programmatically updating the second view as a result of user changes to the first view. In one implementation, the user may edit either the block diagram view 22 of the system being modeled or the three-dimensional view 24 until such time as the user has completed editing. The changes are queued and saved by the view generator 16 until such time as the user indicates the completion of the editing process. Upon completion, a determination is made as to whether the other view that was not originally altered is a candidate for alteration. In the event of correspondence or user or programmatic decision to add the component to a view, the changes may be retrieved from the queue by the view generator. Alternatively, the illustrative embodiment of the present invention may be implemented so as to dynamically update the view that the user is not working on even while changes are ongoing with the users selected view.

Figure 5:
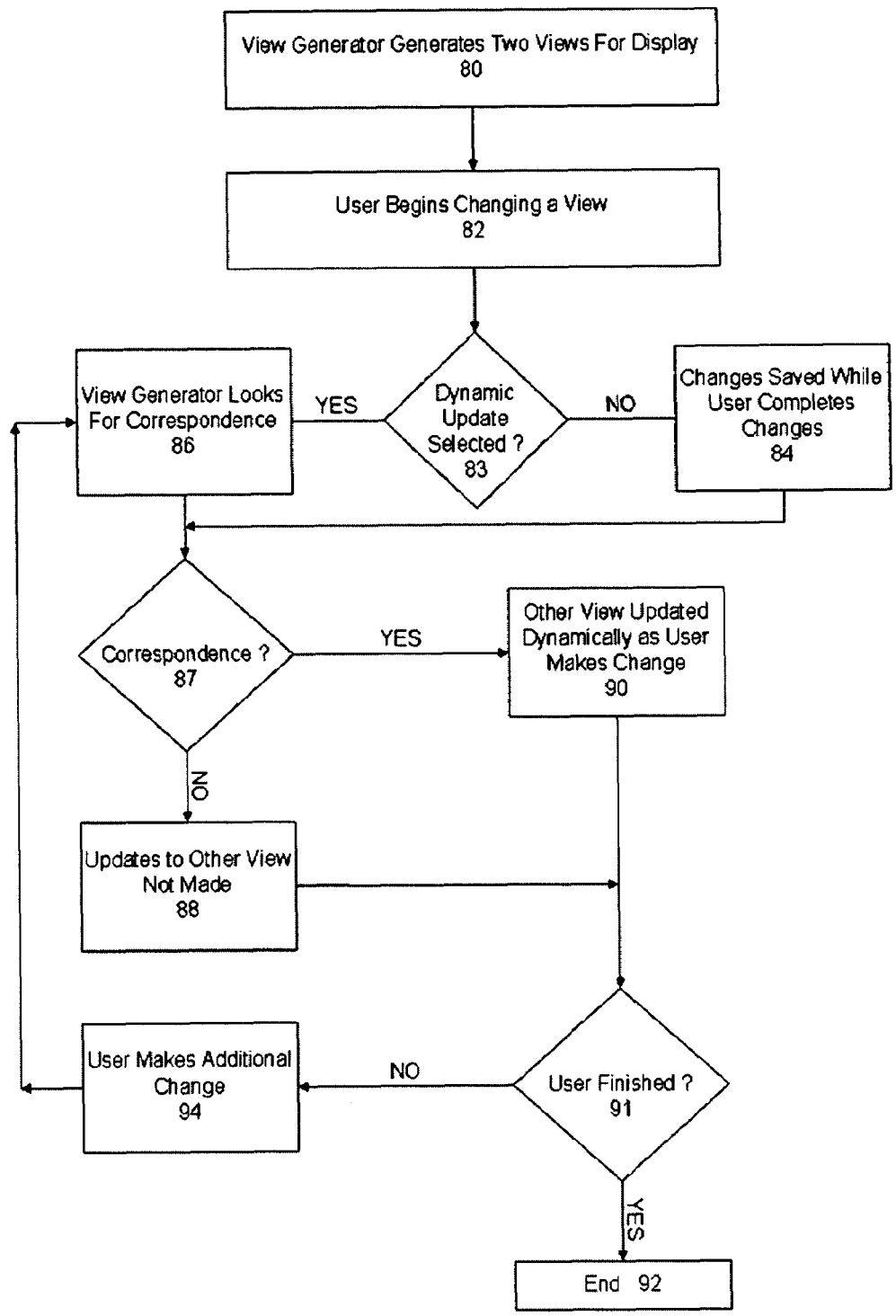
FIG. 5 depicts the sequence of steps followed by the illustrative embodiment of the present invention to update views in response to user changes.

FIG. 5 is a flow chart depicting the sequence of steps followed by the illustrative embodiment of the present invention to execute the dynamic and delayed updating implementations. The sequence begins when the view generator 16 generates the two views for display to the user, the block diagram view 22 and the three-dimensional view 24 of the system being modeled (step 80). Subsequently, the user selects either the block diagram view 22 or three-dimensional view 24 and begins altering the components displayed in the view via a user interface associated with the view (step 82). A view generator 16 determines whether dynamic updating has been selected by the user (step 83). In the event dynamic updating has not been selected by the user 30, the view generator saves any changes made by the user until such time as the user has completed the editing and alteration process (step 84). Alternatively, if the view generator determines that dynamic updating has been selected, the view generator looks for a point of correspondence between the view being altered and edited by the user and the non-edited view (step 86). If a point of correspondence is not determined for the view not being altered by the user, no changes are made to the view (step 88). In an alternative implementation, edited components/features which lack a point of correspondence in the other view may still be added to the other view in the manner discussed above. If a point of correspondence is determined by the view generator 16 the non-user edited view is updated dynamically while the user is continuing to make changes to the selected view (step 90). A determination is made as to whether a user is finished altering the selected view (step 91). If the user is finished updating the selected view, the process ends (step 92). Alternatively, if the user is not finished updating the selected components the view generator 16 waits until the user makes an additional change (step 94) whereupon the view generator begins to look for a point of correspondence for the new change (step 86). For the situations where the dynamic updating feature has not been selected, upon the user completing the alteration process, the view generator consults the saved changes and processes them in order checking for correspondence according to the process described above.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system, configurations that fall within the scope of the current invention. Likewise, the sequences of steps utilized in the illustrative flowcharts are examples and not the exclusive sequence of steps possible within the scope of the present invention.

We claim:

1. A computerized method for synchronizing model views, comprising:
    providing a model that is visually expressible in a block diagram view and in a three dimensional view;
    providing the block diagram view and the three dimensional view of the model;
    displaying the model on a visual display in the provided block diagram view;
    receiving a modification to the provided block diagram view of the model from a user; and
    synchronizing the provided three dimensional view and the provided block diagram view of the model by updating the provided three dimensional view of the model with the modification to the provided block diagram view concurrently with modifying the provided block diagram view such that the modification is available for both the provided block diagram view and the provided three dimensional view.

2. The method of claim 1 wherein the modification is input as an alteration of the provided block diagram view.

3. The method of claim 2 wherein the updating step further comprises comparing the modification with a point of correspondence, the method further comprising updating the provided three dimensional view where a point of correspondence is found.

4. The method of claim 1 further comprising:
    storing the modification independent of the model.

5. The method of claim 4 further comprising:
    updating the provided block diagram view from the stored modification.

6. The method of claim 5 further comprising:
    updating the provided three dimensional view from the stored modification.

7. The method of claim 1 further comprising:
    displaying the updated model in a view other than the provided block diagram view.

8. The method of claim 1 wherein the step of updating the provided three dimensional view of the model is performed when the user indicates that modifications are complete.

9. The method of claim 1 wherein the step of updating the provided three dimensional view of the model is performed when the modification is received.

10. A system for synchronizing model views, comprising:
    a display device;
    a block diagram environment having:
        a model data device storing a model expressible as a block diagram view and as a three dimensional view, and
        a view generator to generate the block diagram view and the three dimensional view of the model, the display device displaying the generated block diagram view; and
    a user interface to accept user inputs, the user inputs to include at least one modification to the generated block diagram view of the model, the model data device to synchronize the provided three dimensional view and the provided block diagram view of the model by updating the generated three dimensional view of the model with the modification to the generated block diagram view concurrently with modifying the provided block diagram view such that the modification is available to both the generated block diagram view and the generated three dimensional view.

11. The system of claim 10 wherein the at least one modification is stored in the view generator.

12. The system of claim 11 wherein the view generator updates the generated block diagram view in the display device from the stored modification.

13. The system of claim 10 wherein the at least one modification is an alteration of the displayed generated block diagram view.

14. A computer-readable medium storing machine-executable instructions for synchronizing model views, the medium storing:
   instructions for providing a model that is visually expressible in a block diagram view and in a three dimensional view;
   instructions for providing the block diagram view and the three dimensional view of the model;
   instructions for displaying the model on a visual display in the provided block diagram view;
   instructions for receiving a modification to the provided block diagram view of the model from a user; and
   instructions for synchronizing the provided three dimensional view and the provided block diagram view of the model by updating the provided three dimensional view of the model with the modification to the provided block diagram view concurrently with modifying the provided block diagram view such that the modification is available for both the provided block diagram view and the provided three dimensional view.

15. The medium of claim 14 wherein the modification is input as an alteration of the provided block diagram view.

16. The medium of claim 15 wherein the instructions for updating further comprise instructions for comparing the modification with a point of correspondence, the medium further comprising instructions for updating the provided three dimensional view where a point of correspondence is found.

17. The medium of claim 14 further comprising instructions for storing the modification independent of the model.

18. The medium of claim 17 further comprising instructions for updating the provided block diagram view from the stored modification.

19. The medium of claim 18 further comprising instructions for updating the provided three dimensional view from the stored modification.

20. The medium of claim 14 further comprising instructions for displaying the updated model in a view other than the provided block diagram view.

21. The medium of claim 14 wherein the instructions for updating the provided three dimensional view of the model are executed when the user indicates that modifications are complete.

22. The medium of claim 14 wherein the instructions for updating the provided three dimensional view of the model are executed when the modification is received.

* * * * *